Nov. 27, 1934.  B. P. DAVIS  1,982,591
WINDSHIELD AND WINDOW VENTILATOR
Filed April 14, 1933
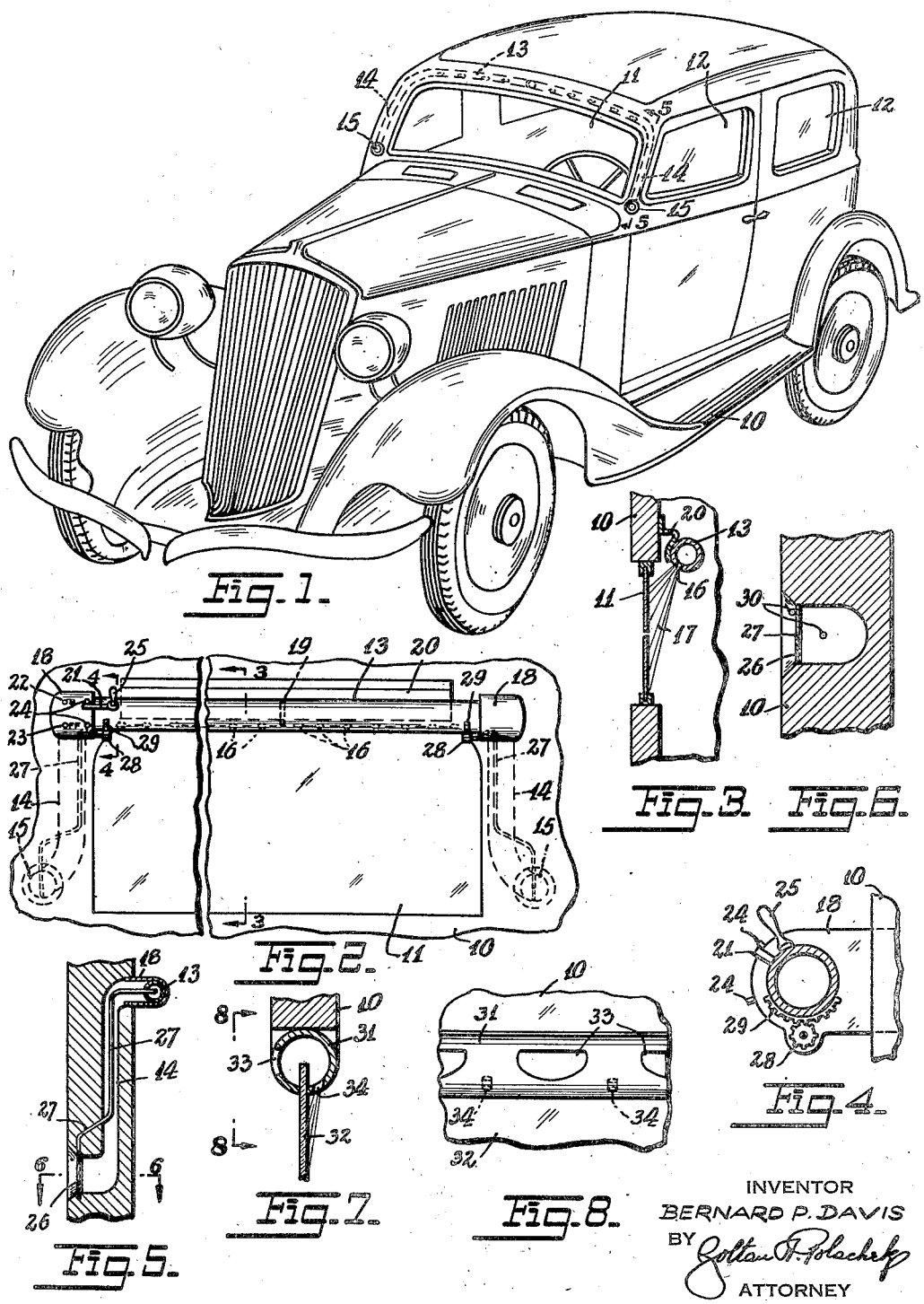
INVENTOR
BERNARD P. DAVIS
BY
ATTORNEY Patented Nov. 27, 1934

1,982,591

UNITED STATES PATENT OFFICE 1,982,591

WINDSHIELD AND WINDOW VENTILATOR

Bernard P. Davis, Brooklyn, N. Y.

Application April 14, 1933, Serial No. 666,113

6 Claims. (Cl. 98—2)

This invention relates to new and useful improvements in a windshield and window ventilator.

It is generally known that on damp days the windshield and windows of a vehicle become clouded with vapors which interfere with viewability. This invention has for an object the provision of a novel arrangement of a ventilator so as to prevent the vapors from settling upon the windshield or windows of a vehicle.

Still further the invention contemplates the provision of a tube supported above and extending the entire length of the window or windshield and provided with openings adapted to direct a stream of air against the inner sides of the windshield and windows, and an arrangement whereby the motion of the vehicle is utilized to cause air to enter said tube.

Still further the invention contemplates the provision of a partition within the tube arranged in a manner so as to force the air to leave through the openings designed to direct it against the window pane.

As another object of this invention, it is proposed to construct the body of the vehicle with air passages terminating in openings arranged so as to readily receive a draft of air as the vehicle is in motion, and connecting with a tubular member provided with openings, to direct the air against the inner side of the windshield or window pane.

Still further this invention contemplates an arrangement whereby the operation of the ventilator may be turned off when it is not needed on clear days.

As another object of this invention, it is proposed to arrange butterfly valves at the openings in the vehicle body for cutting off the draft on dry days and an arrangement whereby these valves automatically close upon rotation of the tubular member in a manner so as to move the openings against a closing baffle plate.

Still further the invention contemplates the provision of a windshield and window pane ventilator which makes use of a tubular member engaged upon the top edge of the window pane or windshield and arranged with openings upon one side adapted to emit air and other openings upon the other side adapted to force the air against the inner sides of the windshield and window pane.

Still further the invention contemplates the construction of a device as mentioned which is simple and durable and which may be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a perspective view of a motor vehicle equipped with a ventilator constructed according to this invention.

Fig. 2 is a fragmentary inside view of the motor vehicle shown in Fig. 1 viewing the windshield.

Fig. 3 is a sectional view taken on the line 3—3 of Fig. 2.

Fig. 4 is a sectional view taken on the line 4—4 of Fig. 2.

Fig. 5 is a fragmentary sectional view taken on the line 5—5 of Fig. 1.

Fig. 6 is a horizontal sectional view taken on the line 6—6 of Fig. 5.

Fig. 7 is a view similar to a portion of Fig. 3 but illustrating a modification.

Fig. 8 is an elevational view looking in the direction of the line 8—8 of Fig. 7.

The windshield ventilator according to this invention is shown upon a motor vehicle 10 which is provided with a windshield 11 and side window panes 12. A tube 13 is supported above and extends the entire length of the windshield 11 and is connected at its end with passages 14 extending through the body of the vehicle and terminating in front in a pair of openings 15 arranged to allow the entrance of the air during travel.

The tube 13 is provided with a plurality of openings 16 spaced fairly close together, say about two inches apart, and arranged so as to direct a stream of air 17 against the inside face of the windshield. At the ends, the tube 13 is rotatively mounted within fittings, 18 which are in the shape of elbows. One of the ends of these elbows is forced into the ends of the passages 14 as clearly shown in Fig. 5. A partition 19 is disposed intermediate the ends of the tube 13 so as to prevent the free circulation of air from one of the openings 15 to the other, and force the air out through the openings 16 instead.

An arrangement is provided whereby the ventilator may be turned off on clear days. This arrangement comprises a baffle shield 20 fixed upon the vehicle body and having a portion in intimate contact with the outside of the tube 13 arranged in a position so that the tube 13 may be rotated to cause the openings 16 to be in intimate contact with the baffle shield and so cut off the supply of air. A pointer 21 is mounted upon one end of the tube 13 and acts upon a scale formed upon one of the elbows 18, which scale has one indication mark "On" indicated by reference numeral 22, and another indication mark "Off" indicated by reference numeral 23; so as to guide turning of the tube 13. Pins 24 are mounted upon the elbow 18 and straddle the pointer 21 and limit turning of the tube 13 to one or the other position. A handle 25 projects from the tube 13 to facilitate turning of the tube.

Furthermore, butterfly valves 26 are arranged in each of the openings 15. These butterfly valves are fixed upon vertical portions 27 of flexible piano wire extending partially through the body of the vehicle and through the passages 14 and terminating in pinions 28 in mesh with gear teeth 29 mounted upon the outside of the tube 13. The arrangement is such that when the tube 13 is rotated the teeth 29 will rotate the pinions 28 correspondingly causing twisting of the piano wires, and turning, which will cause the valves 26 to close, or open depending upon the direction of twisting and turning.

A pair of pins 30 are mounted within each of the passages 14 and limit motion of each of the valves 26 through 90°.

In Figs. 7 and 8 a modified construction of the invention has been disclosed in which a tube 31 is shown mounted upon the upper edge of the windshield or pane 32 and is furthermore, shown provided with openings 33 upon the front side adapted to guide the entrance of air into the tube and a plurality of small openings 34 upon the rear side disposed at an inclination so as to direct a stream of air against the inside of the window pane.

It is to be understood that openings 15 may be located at any suitable position of the vehicle and that the passage 14 may also be either internally or externally located alongside of the body instead of being built therein.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. In combination with the body of a motor vehicle, a window pane, a tube supported above and extending the entire length of the pane and connected at its ends with passages extending through said body and terminating in the front of the vehicle for the entrance of air during travel, and said tube being provided with a plurality of openings to direct the air against the inner surface of said pane.

2. In combination with the body of a motor vehicle, a window pane, a tube supported above and extending the entire length of the pane and connected at its ends with passages extending through said body and terminating in the front of the vehicle for the entrance of air during travel, and said tube being provided with a plurality of openings to direct the air against the inner surface of said pane, a partition being arranged within said tube so as to force the air through the openings and prevent circulation of the air through the tube.

3. In combination with the body of a motor vehicle, a window pane, a tube supported above and extending the entire length of the pane and connected at its ends with passages extending through said body and terminating in the front of the vehicle for the entrance of air during travel, said tube being provided with a plurality of openings to direct the air against the inner surface of said pane, and means for shutting off said ventilator in clear weather or when desired, comprising butterfly valves arranged within said openings, said tube being rotatively mounted, and means for transmitting turning of said tube to rotate the valves into the closed position.

4. In combination with the body of a motor vehicle, a window pane, a tube supported above and extending the entire length of the pane and connected at its ends with passages extending through said body and terminating in the front of the vehicle for the entrance of air during travel, said tube being provided with a plurality of openings to direct the air against the inner surface of said pane, and means for shutting off said ventilator in clear weather or when desired, comprising butterfly valves arranged within said openings, said tube being rotatively mounted, and means for transmitting turning of said tube to rotate the valves into the closed positions, and means for limiting turning of said tube through a specified distance.

5. In combination with the body of a motor vehicle, a window pane, a tube supported above and extending the entire length of the pane and connected at its ends with passages extending through said body and terminating in the front of the vehicle for the entrance of air during travel, said tube being provided with a plurality of openings to direct the air against the inner surface of said pane, and means for shutting off said ventilator in clear weather or when desired, comprising butterfly valves arranged within said openings, said tube being rotatively mounted, and means for transmitting turning of said tube to rotate the valves into the closed position, and means for limiting turning of said tube through a specified distance, rack teeth being mounted upon said tube, pinions meshing with said rack teeth and fixed upon transmission wires connected with said valves to cause turning of said valves upon turning of said tube.

6. In combination with the body of a motor vehicle, a window pane, a tube supported above and extending the entire length of the pane and connected at its ends with passages extending through said body and terminating in the front of the vehicle for the entrance of air during travel, said tube being provided with a plurality of openings to direct the air against the inner surface of said pane, and means for shutting off said ventilator in clear weather, or when desired, comprising butterfly valves arranged within said openings, said tube being rotatively mounted, and means for transmitting turning of said tube to rotate the valves into the closed position, and means for limiting turning of said tube through a specified distance, rack teeth being mounted upon said tube, pinions meshing with said rack teeth and fixed upon transmission wires connected with said valves to cause turning of said valves upon turning of said tube, and a baffle element secured upon the body of said vehicle and arranged so as to cover said openings in the tube in a turned position of the tube in which the butterfly valves are closed.

BERNARD P. DAVIS.